(12) United States Patent
Schneider

(10) Patent No.: US 11,415,158 B2
(45) Date of Patent: Aug. 16, 2022

(54) EXPANSION BOLT, AND CONNECTION ASSEMBLY COMPRISING SUCH AN EXPANSION BOLT

(71) Applicant: HEICO BEFESTIGUNGSTECHNIK GMBH, Ense-Niederense (DE)

(72) Inventor: Norbert Schneider, Ense-Niederense (DE)

(73) Assignee: HEICO BEFESTIGUNGSTECHNIK GMBH, Ense-Niederense (DE)

(*) Notice: Subject to any disclaimer, the term of this patent is extended or adjusted under 35 U.S.C. 154(b) by 200 days.

(21) Appl. No.: 16/754,296

(22) PCT Filed: Oct. 18, 2017

(86) PCT No.: PCT/EP2017/076545
§ 371 (c)(1),
(2) Date: Apr. 7, 2020

(87) PCT Pub. No.: WO2019/076446
PCT Pub. Date: Apr. 25, 2019

(65) Prior Publication Data
US 2021/0199143 A1    Jul. 1, 2021

(51) Int. Cl.
  *F16B 3/06*    (2006.01)
  *F16B 31/04*   (2006.01)
  *F16B 19/02*   (2006.01)
(52) U.S. Cl.
  CPC ............ *F16B 3/06* (2013.01); *F16B 19/02* (2013.01); *F16B 31/04* (2013.01)
(58) Field of Classification Search
  CPC ........ F16B 19/1063; F16B 3/06; F16B 19/02; F16B 5/0258
  (Continued)

(56) References Cited

U.S. PATENT DOCUMENTS 3,463,527 A * 8/1969 Baker ................... F16B 3/06
                                                    411/78
4,087,896 A * 5/1978 Salter ................... F16B 5/02
                                                    29/256

(Continued)

FOREIGN PATENT DOCUMENTS

WO    2009036740 A1    3/2009

OTHER PUBLICATIONS

International Search Report dated Apr. 25, 2019 in parent International application PCT/EP2017/076545.
(Continued)

*Primary Examiner* — Flemming Saether
(74) *Attorney, Agent, or Firm* — Polson Intellectual Property Law, PC; Margaret Polson; Christopher Sylvain

(57) ABSTRACT

An expansion bolt comprises a bolt having an end-face anchoring means for the tension-resistant anchoring of the bolt on or in a first assembly part, which bolt has a truncated-cone-shaped cone section and a bolt threaded section in its end section opposite to the anchoring means with a nut screwed thereon, an expansion sleeve having a cylindrical lateral surface and an inner cone contour interacting with the cone section of the bolt, and a clamping device supported on a second assembly part for widening the expansion sleeve and applying an axial clamping force to the assembly parts to be connected together. The cone section of the bolt is tapered in the direction toward its anchoring means and the inner cone contour of the expansion sleeve is tapered in the same direction. The expansion sleeve bears a clamping flange protruding outward in the radial direction on its end opposite to the inner cone contour. The clamping device comprises a clamping ring having an axial passage opening. The expansion sleeve engages through this passage opening, permitting an adjustability of the expansion sleeve in relation to the clamping ring in the axial direction, and protrudes with its clamping flange beyond a peripheral region of the clamping device enclosing the passage opening. The clamping ring also comprises multiple pressure bolts arranged circumferentially distributed, which mesh with their thread in internally threaded holes extending through the clamping ring in the axial direction and act with their bases indirectly or directly against the second assembly part to widen the expansion sleeve and apply an axial clamping force to the assembly parts. Furthermore, a connection assembly having such an expansion bolt is described.

9 Claims, 3 Drawing Sheets

(58) Field of Classification Search
USPC .......................................................... 411/54
See application file for complete search history.

(56) References Cited

U.S. PATENT DOCUMENTS

| | | | | |
|---|---|---|---|---|
| 4,743,138 | A * | 5/1988 | Goy | B23P 11/02 |
| | | | | 403/337 |
| 5,775,831 | A * | 7/1998 | Mullenberg | F16B 2/14 |
| | | | | 403/337 |
| 8,057,145 | B2 * | 11/2011 | Dolan | F16B 5/0258 |
| | | | | 411/57.1 |
| 8,496,394 | B2 * | 7/2013 | Schneider | F16B 5/02 |
| | | | | 403/370 |
| 10,962,040 | B2 * | 3/2021 | Rosen | F16B 37/046 |
| 2009/0202316 | A1 * | 8/2009 | Petri Larrea | F16B 19/02 |
| | | | | 411/49 |
| 2014/0348613 | A1 | 11/2014 | Davis | |
| 2021/0387298 | A1 * | 12/2021 | McPhee | F16B 31/043 |

OTHER PUBLICATIONS

Written Opinion of the International Searching Authority dated Apr. 25, 2019 in parent International application PCT/EP2017/076545.

* cited by examiner

EXPANSION BOLT, AND CONNECTION ASSEMBLY COMPRISING SUCH AN EXPANSION BOLT

BACKGROUND

The present disclosure relates to an expansion bolt comprising
- a bolt having an end-face anchoring means for the tension-resistant anchoring of the bolt on or in a first assembly part, which bolt comprises a truncated-cone-shaped cone section and a bolt threaded section, in its end section opposite to the anchoring means, having a nut screwed thereon,
- an expansion sleeve having a cylindrical lateral surface and having an inner cone contour interacting with the cone section of the bolt, and
- a clamping device supported on a second assembly part for widening the expansion sleeve and for applying an axial clamping force to the assembly parts to be connected to one another.

The subject matter of the present disclosure is furthermore related to a connection assembly comprising such an expansion bolt and two assembly parts to be clamped with one another.

Expansion bolts are used to produce formfitting connections of, for example, flange connections, if particularly high forces are to be transmitted. One area of application for such expansion bolts are wind turbines, for example, for attaching a compensation coupling having its one side on the drive-shaft driven by the rotor and having its other side on a generator shaft, wherein the latter is typically connected to the generator with a gearing interconnected. Such a compensation coupling is used to compensate for axial, radial, or angular offset.

Expansion bolts, which engage with their bolt in a blind hole, are often used for such formfitting connections. An expansion bolt of the type under discussion comprises a bolt, which can comprise a threaded section as an anchoring means, using which it is secured in an internally threaded hole introduced into a blind hole of a first assembly part. An anchoring acting in the axial direction of the bolt is required to apply the desired tension forces during the clamping thereof. This bolt has a truncated-cone-shaped cone section, which acts on an expansion sleeve seated thereon having a complementary inner cone contour. The cone section is tapered facing away from the anchoring means of the bolt. The tapering is thus executed in the direction toward the orifice of the blind hole. By moving the expansion sleeve in relation to the bolt in the axial direction, the former can be widened. The expansion sleeve is typically slotted. Such an expansion bolt is known from EP 2 191 150 B1. In this previously known expansion bolt, the expansion sleeve bears an external thread in its section protruding out of an assembly hole. On the end opposite to the anchoring means embodied as a threaded section, the bolt bears a threaded section on which a clamping nut is screwed, typically having an outer tool contour for the application of a tightening tool. A lock nut is screwed onto the external thread section of the expansion sleeve. After the bolt is fixed using its anchoring means embodied as a threaded section in the blind hole of a first assembly part, the expansion sleeve is inserted into the assembly hole. It is to be ensured in this case that a gap remains between the clamping nut and the outer side of the second assembly part. Subsequently, the clamping nut is screwed onto the bolt threaded section until it comes into contact with the expansion sleeve. By further screwing on, against the background of the anchoring of the bolt in the blind hole, the expansion sleeve is pressed into the assembly hole against the tapering of the cone section oriented toward the tensioning screw and the inner cone contour of the expansion sleeve. This causes widening of the expansion sleeve until the above-described gap is closed. The radial pressure, which is introduced via the expansion sleeve into the wall, enclosing the assembly hole, of the two assembly parts to be clamped, can be configured via the gap width between the lock nut and the outer side of the second assembly part before the tightening of the clamping nut. Further tightening of the clamping nut after closing of the gap generates the desired axial force on the assembly parts to be clamped with one another.

Such expansion bolts have to be loosened, for example during maintenance work. In this previously known expansion bolt, an extraction tool is required, which, after removal of the clamping nut, for example, is screwed onto an external thread of the lock nut, to be able to pull the expansion sleeve out of the assembly hole while canceling out the clamp lock with the cone section of the bolt. The use of an extraction tool required in the case of this expansion bolt to loosen the expansion bolt is sometimes considered to be cumbersome because of the handling of the extraction tool itself and the numerous actions to be carried out. The time required for the loosening is quite time-consuming, above all if a plurality of expansion bolts have to be loosened in such a compensation coupling. In applications as described above by way of example in conjunction with a wind turbine, the installation space for such expansion bolts and/or the components thereof protruding out of the assembly holes is typically restricted, which additionally obstructs the handling of an extraction tool.

If the installation space is limited, it sometimes causes significant difficulties, above all in the case of expansion bolts having larger diameters, to apply the required clamping force via a hexagonal clamping nut, in any case not manually. In the case of constricted installation conditions, as already indicated, clamping tools driven hydraulically or in another manner often cannot be used.

SUMMARY

Proceeding from this background, an aspect of the present disclosure is based on refining an expansion bolt of the type mentioned at the outset in such a way that not only loosening thereof is fundamentally simplified, but rather also tightening thereof.

This is achieved by an expansion bolt of the type mentioned at the outset, in which the cone section of the bolt is tapered in the direction toward its anchoring means and the inner cone contour of the expansion sleeve is tapered in the same direction, in which the expansion sleeve bears a clamping flange protruding outward in the radial direction on its end opposite to the inner cone contour, and in which the clamping device comprises a clamping ring having an axial passage opening, wherein the expansion sleeve engages through the passage opening, permitting an adjustability of the expansion sleeve in relation to the clamping ring in the axial direction, and protrudes with its clamping flange beyond a peripheral region of the clamping device enclosing the passage opening, and also comprises multiple pressure bolts, which are arranged circumferentially distributed, and which mesh with the thread thereof in the axial direction in internally threaded holes engaging through the clamping ring and act indirectly or directly with their bases against the second installation part to widen the expansion sleeve and to apply an axial clamping force on the assembly parts to be clamped with one another.

This aspect is also achieved by a connection assembly comprising such an expansion bolt and at least two assembly parts to be clamped with one another, wherein the bolt of the expansion bolt is secured with its anchoring means, embodied as a threaded section, in a blind hole of the first assembly part equipped with a complementary internal thread, and an assembly hole embodied having larger diameter is arranged adjacent to the internally threaded hole of the first assembly part, which assembly hole also engages in the same diameter through the second assembly part to be clamped with the first assembly part, and the clamping device is supported on the outer side of the second assembly part opposite to the first assembly part and acts in the clamped state with its clamping ring against the clamping flange of the expansion sleeve, and the clamping flange acts against the nut screwed onto the bolt threaded section.

In this expansion bolt, the cone section of the bolt is tapered in the direction toward its anchoring means. The inner cone contour of the expansion sleeve is also tapered in the same direction. Clamping of the expansion bolt is therefore performed by applying a tension force to the expansion sleeve, in contrast to the expansion bolt known from EP 2 191 150 B1. For this purpose, the expansion sleeve bears a clamping flange protruding outward in the radial direction on its end opposite to the inner cone contour. A clamping device is supported on this flange, which acts against the outer side of the second assembly part, specifically either indirectly or directly. The clamping device acts on the second assembly part indirectly if a thrust washer is interposed. The clamping device itself comprises a clamping ring having a passage opening. The expansion sleeve extends through this passage opening, specifically in such a way that the expansion sleeve can be moved in the passage opening in the axial direction in relation to the clamping ring. The clamping device is therefore not attached to the expansion sleeve in this expansion bolt. The clamping flange protrudes beyond the peripheral regions of the clamping ring delimiting the passage opening. Multiple pressure bolts arranged circumferentially distributed are used for clamping the clamping device. These bolts each mesh with the internal thread of a hole extending through the clamping ring and equipped with an internal thread. The clamping screws are supported with their base either on a thrust washer or directly on the surface of the second assembly part. If the clamping device is tightened, the tension force required for clamping the expansion bolt is introduced via the clamping flange into the expansion sleeve. The use of a plurality of pressure bolts permits an application of extremely high clamping forces even without machine clamping tools, since the clamping force to be applied is allocated onto the plurality of the pressure bolts, on the one hand, and the required tightening torque decreases with the third power of the diameter, on the other hand.

It is advantageous in this expansion bolt that the expansion sleeve does not have to have an external thread. In particular in the case of expansion bolts which are larger in diameter, this is complex, as is the cutting of a complementary internal thread in a lock nut, as is provided in the prior art.

A nut is also seated on the bolt threaded section in this expansion bolt. However, it is not used for clamping, but rather merely to provide a clamping buttress, via which the axial clamping force can be introduced into the bolt. In contrast to the previously known construction, this nut is not moved under load, so that tools driven hydraulically or in another manner are not required for this purpose.

Before the actual tightening of the clamping device, it is configured in such a way that a gap remains between the clamping flange of the expansion sleeve and the nut seated on the bolt threaded section. This gap width defines the radial pressure to be introduced into the assembly hole, therefore the amount of the widening of the expansion sleeve. If, in the course of the tightening of the clamping device, the expansion sleeve has been drawn enough out of the assembly hole and has been widened in this course enough that its clamping flange is brought into contact on the buttress nut, the axial tensioning is introduced into the bolt and thus into the assembly parts to be clamped with one another by further tightening of the clamping device.

Loosening of this expansion bolt is very simple. In a first step, the clamping device is loosened. In this case, the clamping ring is moved away from the clamping flange of the expansion sleeve. Subsequently, loosening of the expansion sleeve with its inner cone contour from the cone section of the bolt is possible either in that the nut seated on the bolt threaded section is screwed farther onto the thread and thus tightened, which results in pressing of the expansion sleeve into the assembly hole. The clamp lock between the cone section of the bolt and the inner cone contour of the expansion sleeve is thus loosened. Therefore, in the case of the subject matter of this expansion bolt, loosening thereof is performed by corresponding pressing of the expansion sleeve into the assembly hole in the direction of the taper of the cone section. Alternatively, this nut can also be unscrewed from the bolt threaded section and the expansion sleeve can be driven into the assembly opening by a hammer strike. If the clamp lock between the outer lateral surface of the expansion sleeve and the wall of the assembly hole and also on the inner side between the inner cone contour and the cone section is loosened, the anchoring of the bolt in or on the first assembly part can be loosened, to then firstly pull the bolt and subsequently the expansion sleeve out of the assembly hole.

The expansion sleeve is typically slotted, specifically having one or two or also a larger number of expansion slots diametrically opposite to one another with respect to the longitudinal axis. The expansion sleeve is embodied according to one embodiment having a larger external diameter on its section not provided for engaging in an assembly hole, which is preferably provided by an increase of the wall thickness of the expansion sleeve.

BRIEF DESCRIPTION OF THE DRAWINGS

The description below is provided on the basis of an example embodiment with reference to the appended figures, wherein.

DETAILED DESCRIPTION

Figure 1:
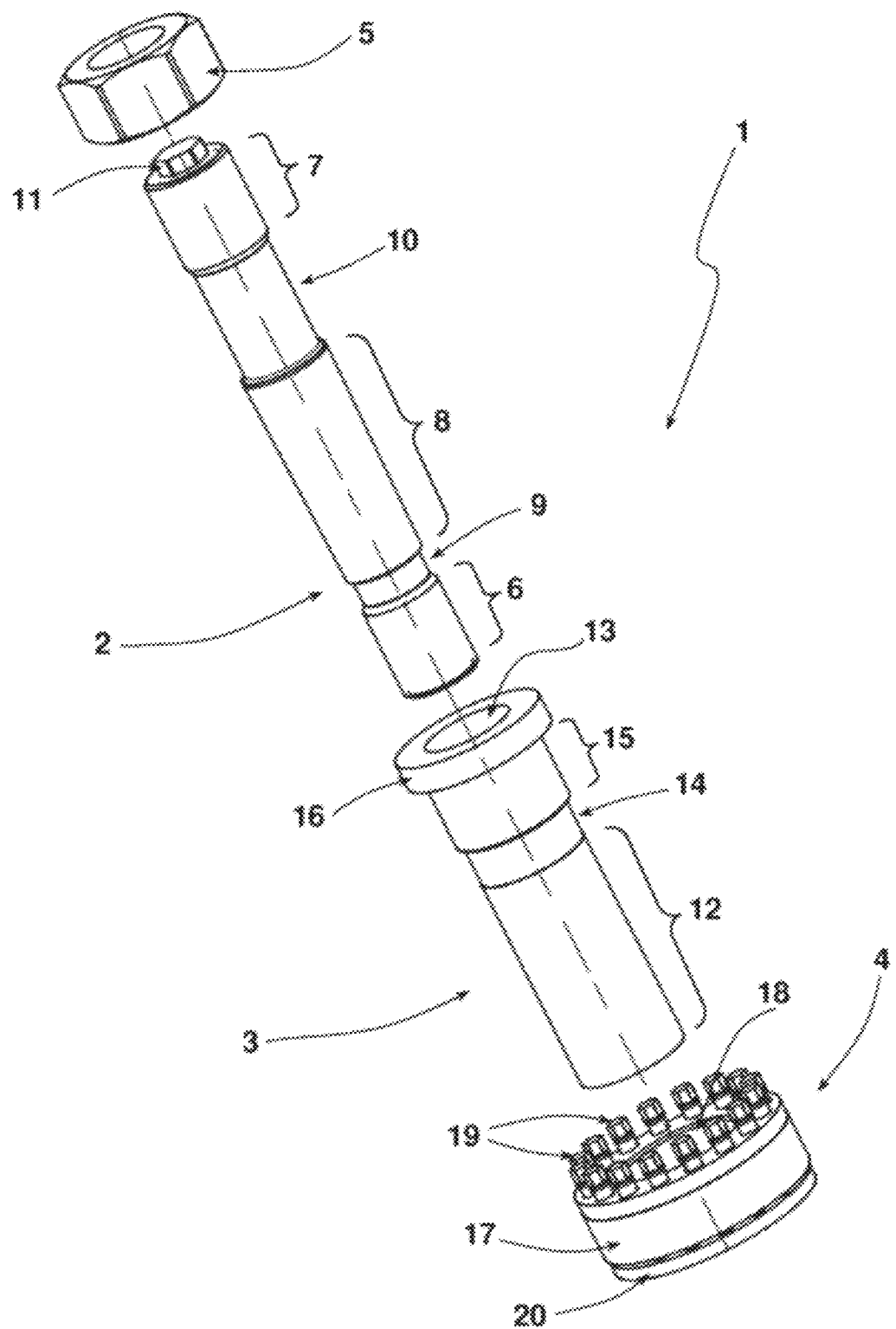
FIG. 1 shows a perspective view of an expansion bolt in an exploded illustration.

With reference to FIG. 1, an expansion bolt 1 comprises a bolt 2, an expansion sleeve 3, and a clamping device 4. Furthermore, the expansion bolt 1 has a buttress nut 5. The bolt 2 bears a threaded section 6 on its first end, which is used in the illustrated embodiment as an anchoring means for securing the bolt 2 on a first assembly part. The first assembly part has a blind hole for this purpose, having a corresponding internally threaded section embodied complementary. The end section of the bolt 2 opposite to the threaded section 6 is embodied as a bolt threaded section 7. The buttress nut 5 is screwed onto the bolt threaded section 7.

In its middle section, the bolt 2 bears a cone section 8, the length of which is dependent on the desired radial pressure and the length of an assembly hole, which engages in or extends through the assembly parts to be connected to one another. The cone section 8 is tapered at a slight angle in the direction toward the threaded section 6. The cone section 8 is connected by a connecting section 9, which is slightly reduced in diameter, to the threaded section 6 and by a connecting section 10, which is also somewhat reduced in diameter, to the bolt threaded section 7. By changing the length of these connecting sections, the expansion bolt can be modularly adapted to assembly parts having different thicknesses from application to application. Adjacent to the bolt threaded section 7, the bolt 2 bears a formed hexagon head 11, the maximum diameter of which is less than the diameter of the bolt 2 in its bolt threaded section 7. The hexagon head 11 is used as an engagement surface for a tool for fixing the bolt 2 with its threaded section 6 in a threaded hole of a first assembly part. Instead of the tool contour embodied as a hexagon head in the illustrated embodiment, the bolt can also have a different tool contour, for example, a quadrilateral or also a tool contour introduced axially into the bolt, for example, a hexagon socket or the like.

The expansion sleeve 3 has a section 12 having a lateral surface, which has the complementary geometry to the geometry of the assembly hole 30 in the assembly part 22 and blind hole 30 in the assembly part 21. The lateral surface of the expansion sleeve 3 is preferably cylindrical. An expansion slot (not shown in the figures) following the longitudinal extension of the expansion sleeve 3 is introduced into the section 12, as is typical for expansion sleeves in expansion bolts. The expansion slot permits widening of the section 12 of the expansion sleeve 3. The expansion sleeve 3 encloses a central passage channel 13. This passage channel 13 is provided in the section 12 with an inner cone contour, which is embodied in a complementary geometry to the geometry of the cone section 8 of the bolt 2. The inner cone contour of the expansion sleeve 3 is therefore tapered in its section 12 with the same angle in the direction toward the lower end of the expansion sleeve shown in FIG. 1 as the cone section 8 of the bolt 2. The inner cone contour of the expansion sleeve 3 thus abuts flatly on the cone section 8 of the bolt 2. The expansion sleeve 3 can be modularly adapted to assembly parts having differing thickness by a connecting section 14 having a length changeable from application to application. Adjoining thereon, the expansion sleeve 3 has a section 15, on which the clamping device 4 is centered. The upper terminus of the expansion sleeve 3 seen in FIG. 11 is formed by a clamping flange 16 protruding in the radial direction beyond the section 15. To increase the rigidity of the expansion sleeve 3 in the region of the clamping flange 16, section 15 preferably has an external diameter enlarged in relation to the diameter of the connecting section 14 and that of the section 12. Due to this material enlargement, the expansion sleeve 3 is embodied more stably in this region, to provide a higher rigidity to the expansion sleeve 3 in this region upon application of a clamping force acting on the clamping flange 16.

The internal diameter of the passage channel 13 of the expansion sleeve 3 is adapted to the diameter of the bolt 2, specifically in such a way that the bolt 2 can extend through the expansion sleeve 3 with its threaded section 6, so that the inner cone contour in the section 12 of the expansion sleeve 3 comes into contact on the cone section 8 of the bolt 2. The diameter of the passage channel 13 in the illustrated embodiment in the region of its section 15 and of the clamping flange 16 is dimensioned in such a way that the bolt threaded section 7 of the bolt 2 can plunge therein.

The clamping device 4 comprises a clamping ring 17 having a central passage opening 18, through which the expansion sleeve 3 is guided. The internal diameter of the passage opening 18 is dimensioned in such a way that the clamping device 4 is centered on the section 15 of the expansion sleeve 3. A plurality of pressure bolts 19 are held in the clamping ring 17 in axial passage holes in an internally threaded section in each case. The pressure bolts 19 extend through the clamping ring 17 and are supported with the bases thereof on a thrust washer 20, also embodied as a ring. If the pressure bolts 20 are screwed into the internally threaded sections of the clamping ring 17, the thrust washer 20 is moved away from the clamping ring 17, therefore the gap located between the clamping ring of the clamping ring 17 and the thrust washer 20 in FIG. 1 is enlarged. In one design (not shown in the figures), in addition to a pressure bolt, a pressure pin is also arranged in each axial hole of the clamping ring, on which the pressure bolt acts and which acts upon clamping of the clamping device against the thrust washer to be supported on the outer side of the adjacent assembly part.

Figure 2:
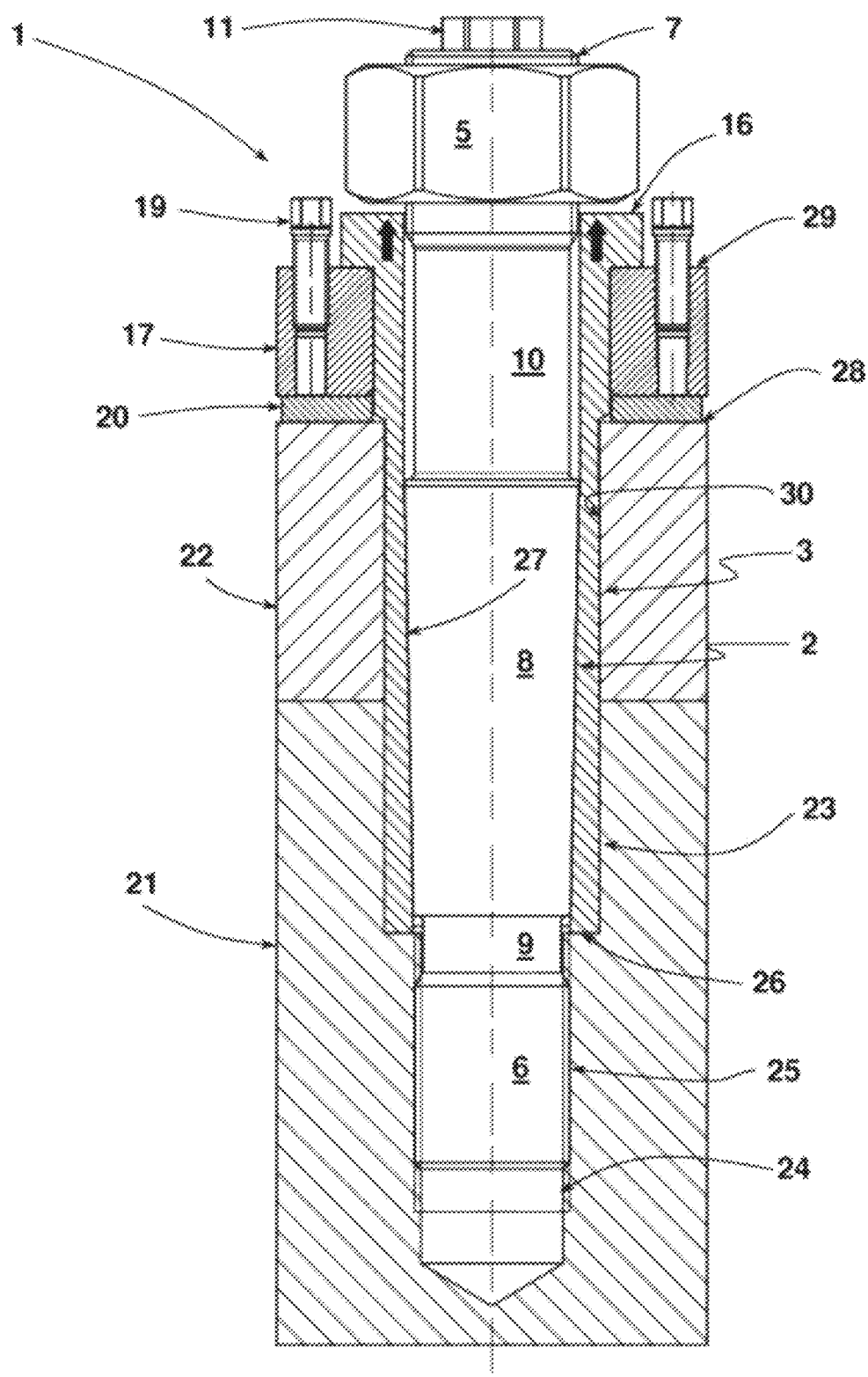
FIG. 2 shows the expansion bolt for clamping two assembly parts inserted into an assembly hole of the two assembly parts before clamping thereof.

FIG. 2 schematically shows the expansion bolt 1 in its not yet clamped position, as it is installed in two assembly parts 21, 22 to be clamped with one another. These assembly parts can be, for example, the shaft ends of a shaft coupling. The first assembly part 21 has a blind hole 23 embodied as stepped, in the lower section 24 of which, which is smaller in diameter, an internal thread 25 is cut in complementary embodiment to the threaded section 6 of the bolt 2. The expansion sleeve 3 abuts with its lower-side end face on the step 26 formed by the stepped formation of the blind hole 23. In the longitudinal sectional illustration shown in FIG. 2, the above-mentioned inner cone contour 27 is recognizable in the section 12 of the expansion sleeve 3. It is clearly recognizable that the cone section 8 of the bolt 2 and the inner cone contour 27 of the expansion sleeve 3 are each tapered with equal taper angle in the direction toward the threaded section 6 of the bolt and thus abut flatly on one another. The two assembly parts 21, 22 adjoin one another axially with a contact surface. The clamping device 4 is supported with its thrust washer 20 on the outer surface 28 of the second assembly part 22. The clamping ring 17 encloses the section 15 of the expansion sleeve 3. The expansion sleeve 3 is not attached with its section 15 to the clamping ring 17.

The clamping flange 16 protrudes beyond the side 29 of the clamping ring 17 facing away from the surface 28, so that the lower side of the clamping flange 16 facing toward the clamping ring 17 rests on the upper side 29. The amount of the overlap and thus the size of the contact surface in the axial direction between the clamping flange 16 of the expansion sleeve 3 and the clamping ring 17 is adapted to the tension forces to be transmitted. This also applies to the design of the thickness of the clamping flange 16. The buttress nut 5 is screwed onto the bolt threaded section 7 of the bolt 2.

The above-described individual parts of the expansion bolt 1 are assembled as follows for the provided connection of the assembly parts 21, 22 to form a formfitting connection assembly. In a first step, the blind hole 23 is brought into arrangement mutually aligned with an assembly hole 30 extending through the second assembly part 22. The diameter of the assembly hole 30 corresponds to the diameter of the blind hole 23 in the section of its largest diameter. Subsequently, the clamping device 4 is pushed onto the section 15 of the expansion sleeve 3 and then the expansion sleeve 3 is inserted with its front end face through the assembly hole 30 up to the step 26 of the blind hole 23 of the first assembly part 21. In this way, the location of the two assembly parts 21, 22 in relation to one another is fixed in the plane of their contact surface. Subsequently, the bolt 2 is inserted with its threaded section 6 into the passage channel 13 of the expansion sleeve 3 until the threaded section 6 comes into contact with the internal thread 25 of the blind hole 23. The threaded section 6 is then screwed into the internal thread 25 to produce a tension-resistant attachment to the first assembly part 21. For this purpose, a tool applied to the hexagon head 11 of the bolt 2 is typically actuated. The bolt 2 is screwed in until the cone section 8 of the bolt 2 touches the inner cone contour 27 of the expansion sleeve 3 without force. Subsequently, the bolt is rotated back by a predetermined rotational angle, so that a defined axial play of the expansion sleeve 3 results because of the thread pitch of the threaded section 6. This axial play is expedient for the later loosening of the expansion bolt 1, if desired. The buttress nut 5 is now screwed onto the bolt 2 sufficiently that a gap remains between the side of the buttress nut 5 facing toward the clamping flange 16 and the upper side 29 of the clamping flange 16. The width of this gap defines the axial movement path, over which the expansion sleeve can be widened with its section 12 bearing the inner cone contour 27, plus the previously set axial play.

To clamp the expansion bolt 1, the pressure bolts 19 are tightened manually or using a corresponding clamping tool, whereby the clamping ring 17 is moved away from the thrust washer 16. Because of the overlap of the clamping flange 16 over the upper side 29 of the clamping ring 17, the expansion sleeve 3 is pulled out of the assembly hole 30 in the course of this movement. Because of the anchoring of the bolt 2 with its threaded section 6 in the internal thread 25, it remains fixed in place. Due to this relative movement between the expansion sleeve 3 and the bolt 2, the expansion sleeve 3 is widened in the radial direction by its contact with the cone section 8 in order to introduce the desired radial pressure into the wall of the holes 23, 30 in this manner. The movement of the expansion sleeve 3 during the tightening of the clamping device 4 is indicated by block arrows in FIG. 2.

Figure 3:
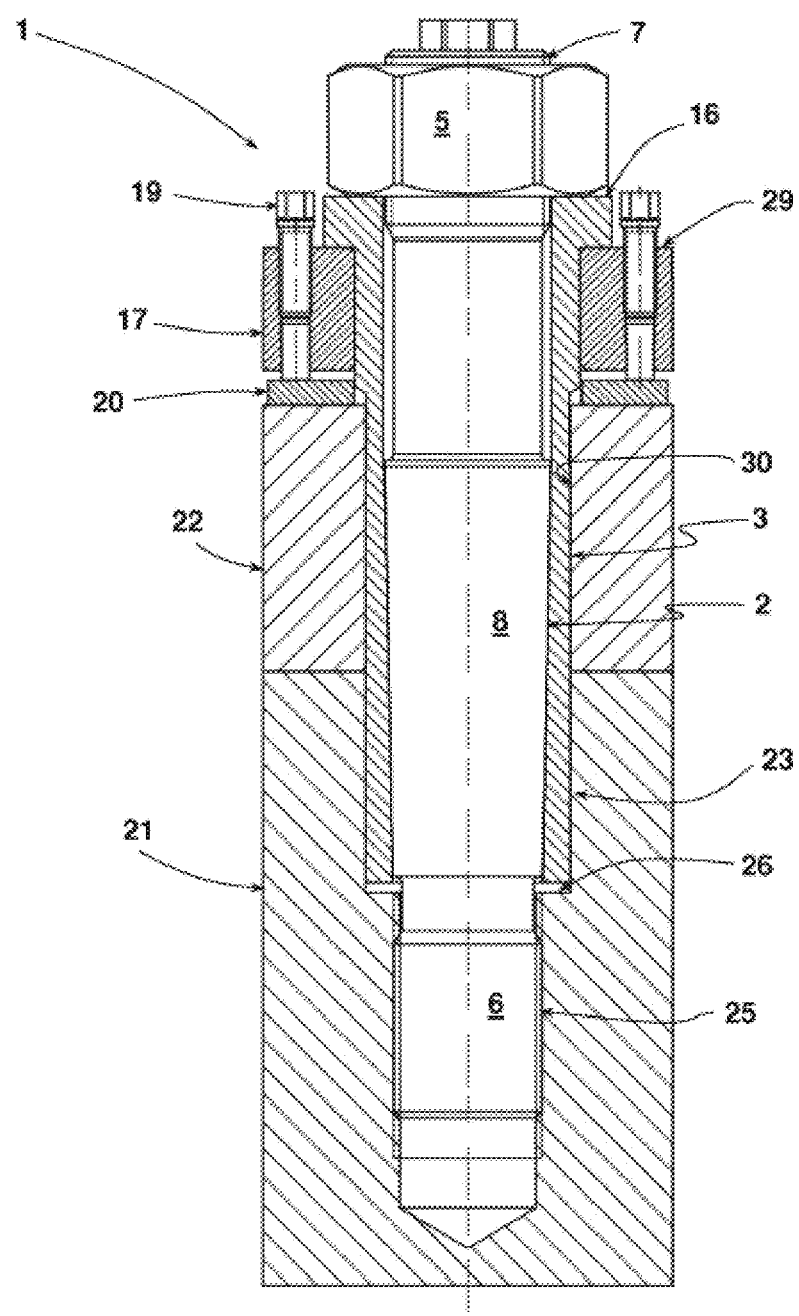
FIG. 3 shows the expansion bolt tightened to clamp the two assembly parts of FIG. 2.

The widening movement of the expansion sleeve 3 ends as soon the clamping flange 16 comes into contact on the lower side of the buttress nut 5. This clamping position is shown in FIG. 3. The movement of the expansion sleeve 3 due to the above-described process is also recognizable due to the spacing apart of the lower end face of the expansion sleeve 3 from the step 26. The tightening procedure is not yet ended, however, when the clamping flange 16 abuts the lower side of the buttress nut 5. Further tightening of the pressure bolts 19 places the connection assembly, consisting of the expansion bolt 1 and the two assembly parts 21, 22, under an axial tension. The two assembly parts 21, 22 are thus clamped with one another in the axial direction. The tightening procedure is ended when the pressure bolts 19 have been tightened using a predetermined torque.

For the case in which the above-described connection assembly is to be loosened again, in a first step, the clamping device 4 is to be disengaged by loosening the pressure bolts 19. The clamping ring 17 is moved in this way in the direction toward the thrust washer 20. To cancel out the clamp lock between the cone section 8 of the bolt 2 and the inner cone contour 27 of the expansion sleeve 3, the buttress nut 5 can be screwed further onto the threaded section 7, whereby the expansion sleeve 3 is pressed into the assembly hole 30 and/or the blind hole 23 until the expansion sleeve 3 is free of load because of the initially set axial play. The bolt 2 forms the buttress for this purpose, the bolt threaded section 7 of which meshes with the buttress nut 5. If the clamp lock is loosened, the bolt 2 can be unscrewed with its threaded section 6 out of the internal thread 25 of the first assembly part 21.

Loosening of the connection assembly can also be effectuated in that after loosening of the clamping device 4, the buttress nut 5 is unscrewed from the bolt threaded section 7 and the expansion sleeve 3 is driven into the assembly hole 30 and the blind hole 23 with a hammer strike directed toward the upper side of the clamping flange 16.

If it is a concern that the buttress nut 5 can no longer be moved on the bolt threaded section 7 at the point in time of the loosening because of appearances of corrosion or the like, the bolt threaded section 7 can be embodied somewhat longer to provide a threaded section for the attachment of a pressing-off device. Such a pressing-off device has a nut body having a central passage opening having an internal thread, which can be screwed onto the then extended bolt threaded section 7. Multiple pressure bolts are each held in an internal thread similarly as in the clamping device 4 in this nut body. These bolts are arranged so as to be supported on the upper side 29 of the clamping flange 16 facing toward the buttress nut 5, past the tool surfaces of the buttress nut 5. Upon actuation of these pressure bolts, the expansion sleeve 3 is pressed into the assembly hole 30 and correspondingly into the blind hole 23, to disengage the friction lock previously produced upon tightening of the expansion bolt. The buttress nut 5 is thus also free of force, so that it may now be loosened more easily.

The invention has been described on the basis of example embodiments. Without leaving the scope of the present claims, numerous further options result for a person skilled in the art for implementing the invention, without these options having to be explained in detail in the scope of these embodiments.

LIST OF REFERENCE NUMERALS 1 expansion bolt
2 bolt
3 expansion sleeve
4 clamping device
5 buttress nut
6 threaded section
7 bolt threaded section
8 cone section
9 connecting section
10 connecting section
11 hexagon head
12 section
13 passage channel
14 connecting section
15 section
16 clamping flange
17 clamping disk 18 passage opening
19 pressure bolt
20 thrust washer
21 assembly part
22 assembly part
23 blind hole
24 section
25 internal thread
26 step
27 inner cone contour
28 surface
29 upper side
30 assembly hole

The invention claimed is:

1. An expansion bolt comprising:
a bolt having a first threaded section at one end for the tension-resistant anchoring of the bolt on or in a first assembly part, said bolt comprises a truncated-cone-shaped cone section and a second threaded section in its end section opposite to the first threaded section with a nut screwed thereon,
an expansion sleeve having a cylindrical lateral surface and an inner cone contour which interacts with the cone section of the bolt, and
a clamping device supported on a second assembly part for widening the expansion sleeve and for applying an axial clamping force to the assembly parts to be connected to one another,
wherein the cone section of the bolt is tapered in the direction toward the first threaded section of the bolt and the inner cone contour of the expansion sleeve is tapered in the same direction,
the expansion sleeve bears a clamping flange protruding outward in the radial direction on its end opposite to the inner cone contour,
the clamping device comprises a clamping ring having an axial passage opening, wherein the expansion sleeve engages through the passage opening, permitting an adjustability of the expansion sleeve in relation to the clamping ring in the axial direction, and protrudes with its clamping flange beyond a peripheral region of the clamping device enclosing the passage opening, and
the clamping device also comprises multiple pressure bolts arranged circumferentially distributed, which mesh with their thread in internally threaded holes extending through the clamping ring in the axial direction and act with their bases indirectly or directly against the second assembly part to widen the expansion sleeve and to apply an axial clamping force to the assembly parts to be clamped with one another.

2. The expansion bolt of claim 1, wherein the clamping device has a thrust washer having an axial passage opening, the expansion sleeve also extends through this axial passage opening, and the pressure bolts are supported with their bases directly or indirectly on one upper side of the thrust washer, while the other upper side of the thrust washer abuts on the second assembly part.

3. The expansion bolt of claim 1, wherein the expansion sleeve is slotted.

4. The expansion bolt of claim 1, wherein the expansion sleeve has, in a section which protrudes out of an assembly hole of the second assembly part, a larger external diameter than in a section which extends into the assembly hole.

5. The expansion bolt of claim 4, wherein the larger external diameter is provided by an increased wall thickness.

6. The expansion bolt of claim 1, wherein the clamping ring is centered with its passage opening on a section of the expansion sleeve adjacent to the clamping flange.

7. The expansion bolt of claim 1, wherein the nut screwed onto the second threaded section is a nut having an external tool engagement contour.

8. The expansion bolt of claim 7, wherein the external diameter of the clamping flange of the expansion sleeve corresponds to the maximum external diameter of the nut screwed onto the second threaded section.

9. A connection assembly comprising an expansion bolt according to claim 1, wherein the bolt of the expansion bolt is secured with its first threaded section in a blind hole of the first assembly part equipped with a complementary internal thread and an assembly hole embodied having a larger diameter is arranged adjacent to the internally threaded hole of the first assembly part, which assembly hole also engages in the same diameter through the second assembly part to be clamped with the first assembly part, and the clamping device is supported on the outer side of the second assembly part opposite to the first assembly part and acts in a clamped state with its clamping ring against the clamping flange of the expansion sleeve and the clamping flange acts against the nut screwed onto the second threaded section.

* * * * *